United States Patent [19]
Chambers et al.

[11] 3,961,234
[45] June 1, 1976

[54] ADAPTIVE FILTERING

[75] Inventors: George Sutton Chambers; Carter Sinclair, both of Waynesboro, Va.

[73] Assignee: General Electric Company, Salem, Va.

[22] Filed: Dec. 29, 1972

[21] Appl. No.: 319,180

[52] U.S. Cl. .............................. 318/561; 318/624; 318/629
[51] Int. Cl.² ........................................ G05B 13/00
[58] Field of Search ........... 318/561, 590, 596, 624, 318/629, 635

[56] References Cited
UNITED STATES PATENTS

| | | | |
|---|---|---|---|
| 2,995,694 | 8/1961 | Sorkin et al. | 318/624 |
| 3,083,321 | 3/1963 | Howe | 318/590 |
| 3,351,829 | 11/1967 | Qvarnstrom | 318/611 |
| 3,382,422 | 5/1968 | Meier | 318/590 X |
| 3,430,053 | 2/1969 | Westhaver | 318/624 X |
| 3,633,088 | 1/1972 | Kupersmith | 318/635 X |
| 3,639,825 | 2/1972 | MacMullen | 318/629 X |

Primary Examiner—Gene Z. Rubinson
Assistant Examiner—John J. Feldhaus
Attorney, Agent, or Firm—Arnold E. Renner

[57] ABSTRACT

An adaptive filter circuit using a time modulated dead band for suppressing the effects of spurious noise associated with an error signal used in controlling a position drive motor associated with process controlling elements. The circuit includes means for restricting all signals, including both control signals and spurious noise, to a positioning motor during those periods of operation when little positioning is required. However, in those instances where a relatively large amount of repositioning is required, the system provides means for switching to a nonrestrictive mode of filtering which thereby permits maximum control over motor operation.

8 Claims, 3 Drawing Figures

ADAPTIVE FILTERING

BACKGROUND OF THE INVENTION

The present invention relates generally to electrical filter systems and more particularly to an adaptive, electrical filter system for an electric actuator used in positioning process-controlling elements.

In the industrial processing environment, process-controlling elements, such as dampers and vanes, are generally required to be controllable to provide a means for adjusting the flow of fluid material through industrial ducting. In the past, pneumatic control of damper or vane actuators was practiced extensively, but in recent times electrically controlled actuators are used more often. The electrically controlled actuators employ electric motors, generally AC, to drive the actuators and have gained acceptability largely on account of the efficient, responsive control available therewith.

A problem has persisted with the electrical actuators, however, which heretofore has defied any practical solution. That problem concerns itself with spurious noise generally associated with an error signal used for varying the position of the damper or vane. Generally speaking, all electric actuators employ what is most commonly referred to as a closed-loop feedback control system whereby an error signal generated by a process-sensitive transducer is introduced into the loop whenever one or more of the parameters being monitored determines that a change in the fluid flow through the ducting is required. The error signal introduced into the loop is used to activate the control of an AC motor which causes the damper or vane to change its physical position within the ducting in order to null the error signal. Unfortunately, however, even in those instances where no error signal is intended to be generated, noise associated with the necessarily high gain loop causes constant energization and deenergization of the motor leading to unnecessary motor heating and gear wear as well as gross inefficiency in operation.

In the past, the problems associated with a noisy loop were avoided by merely decreasing the gain of the loop or increasing the dead band. In general, this avoided the problem of constant motor energization and deenergization, but greatly decreased the sensitivity of the control circuit. Other prior art attempts at decreasing the effects of the noise associated with the loop have included various reactive filter networks interposed within the loop, all of which methods provided less sensitive control of the actuator.

SUMMARY OF THE INVENTION

The present invention provides an adaptive electrical filter circuit for use in suppressing noise associated with an error signal used in controlling a drive motor of an electric actuator. In general, electric actuators provide thyristors (SCRs) as a means of controlling the application of power to an AC positioning drive motor used in regulating the relative position of dampers or vanes within industrial ducting. Whenever monitored parameters determine that a variation of fluid flow through the ducting is required, an error signal is generated and fed to a firing circuit for the purpose of providing a control signal to trigger the SCRs. The control signal causes the drive motor to reposition the dampers or vanes so as to further cause the monitored parameters to assume the desired state. However, even while the dampers or vanes are in some desired state and no error signals are being produced to cause any repositioning thereof, spurious noise generated within the process loop causes the SCRs to respond as though an actual control signal was being introduced. The adaptive filter of the subject invention provides means for suppressing the effects of this noise while still preserving the necessary sensitivity of control over motor operation. This is accomplished by providing means for limiting the actual time a control signal is to be applied to the SCRs during those periods when the damper or vanes are within some small deviation of the desired position and the corresponding error signal generated is less than some predetermined value. In effect, therefore, by limiting error signal control over the motor when the error signal is of a low magnitude, noise signals are also limited in their control over the motor. Thus, while sacrificing control over the motor during periods when small, relatively insignificant corrections in damper or vane repositioning are demanded, undesirable motor operation due to spurious noise is avoided. When the error signal rises above the predetermined value, however, the adaptive filter adjusts itself so as to allow the error signal maximum control over the SCRs. Moreover, after the error signal assumes control, the system provides for the retention of control over the motor by the error signal for a period long enough to reposition the damper or vanes within an even closer tolerance value than that position which would cause an error signal to be generated having a magnitude greater than or equal to the original predetermined value.

It is, therefore, an object of the present invention to provide an improved filter system for use in conjunction with an electric actuator.

Another object of the invention is to provide an improved filter network which permits an error signal to effect a motor positioning circuit of an electric actuator only during selected times.

A further object of the invention is to provide an improved filter network which permits an error control signal to effect a motor positioning circuit of an electric actuator at a first minimum control rate when the magnitude of the error control signal is relatively small, and at a second maximum control rate when the magnitude of the error control signal is relatively large.

DESCRIPTION OF THE PREFERRED EMBODIMENTS

Figure 1:
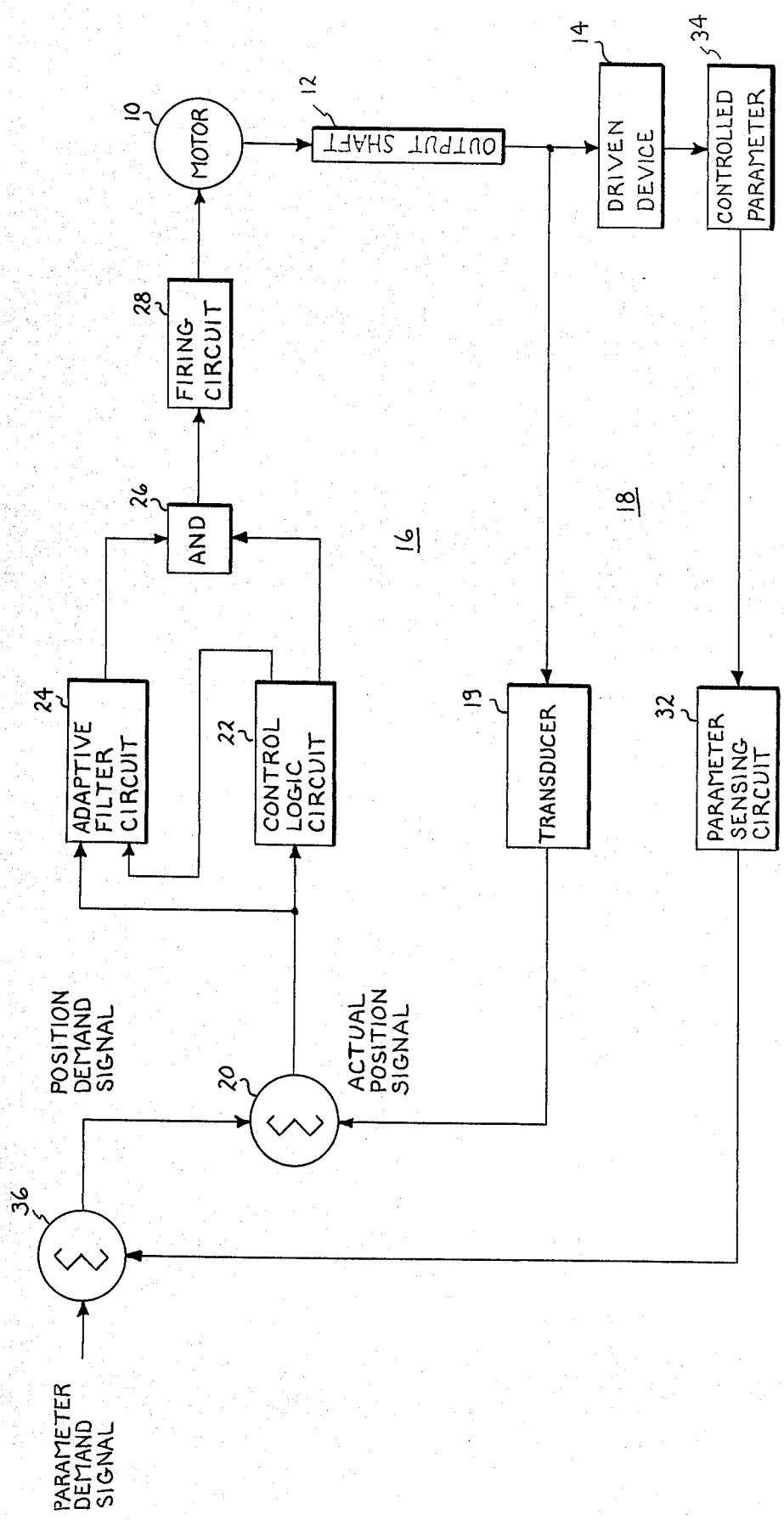
FIG. 1 is a block diagram of a complete electrical actuator system.

Reference is first made to FIG. 1 of the drawings wherein a block diagram illustrating a complete electrical actuator system for positioning process-controlling elements is disclosed. In that drawing, a motor 10 having an output shaft 12 is used to position a driven device 14 such as a damper or vane as used in industrial ducting. In the preferred embodiment, the actuator system includes two principal feedback loops, 16 and 18. Loop 16 consists of the motor and output shaft, a transducer 19, a summing circuit 20, a control logic circuit 22, the adaptive filter circuit 24 of the subject invention, AND gate 26 and a firing circuit 28 which includes associated SCRs. Feedback loop 18 includes controlled parameter 34, a parameter sensing circuit 32 and a summing circuit 36.

The summing circuit 20 has introduced thereinto, two inputs: an actual position signal input from transducer 19 and a position demand signal input from summing circuit 36. In response to these two inputs, summing circuit 20 generates an error signal which is fed to the control logic circuit 22 and the adaptive filter circuit 24 of the subject invention. In the control logic circuit means are provided for generating both a timing signal of regularly spaced pulses, as well as a control signal which also occurs in pulse form having a pulse width proportional to the error signal produced by summing circuit 20. The adaptive filter circuit 24, which receives the timing signal from control logic circuit 22, operates in conjunction with that circuit to provide a means for selectively filtering spurious noise generated within the closed loops. The control signal generated by the control logic circuit is fed to AND gate 26 which also receives, at selected times, enabling signals from the adaptive filter circuit 24, thereby allowing the control signal to pass on to firing circuit 28. Firing circuit 28, in response to the control signal received from AND gate 26, provides means for firing the SCRs included therein to control operation of the motor 10.

Figure 2:
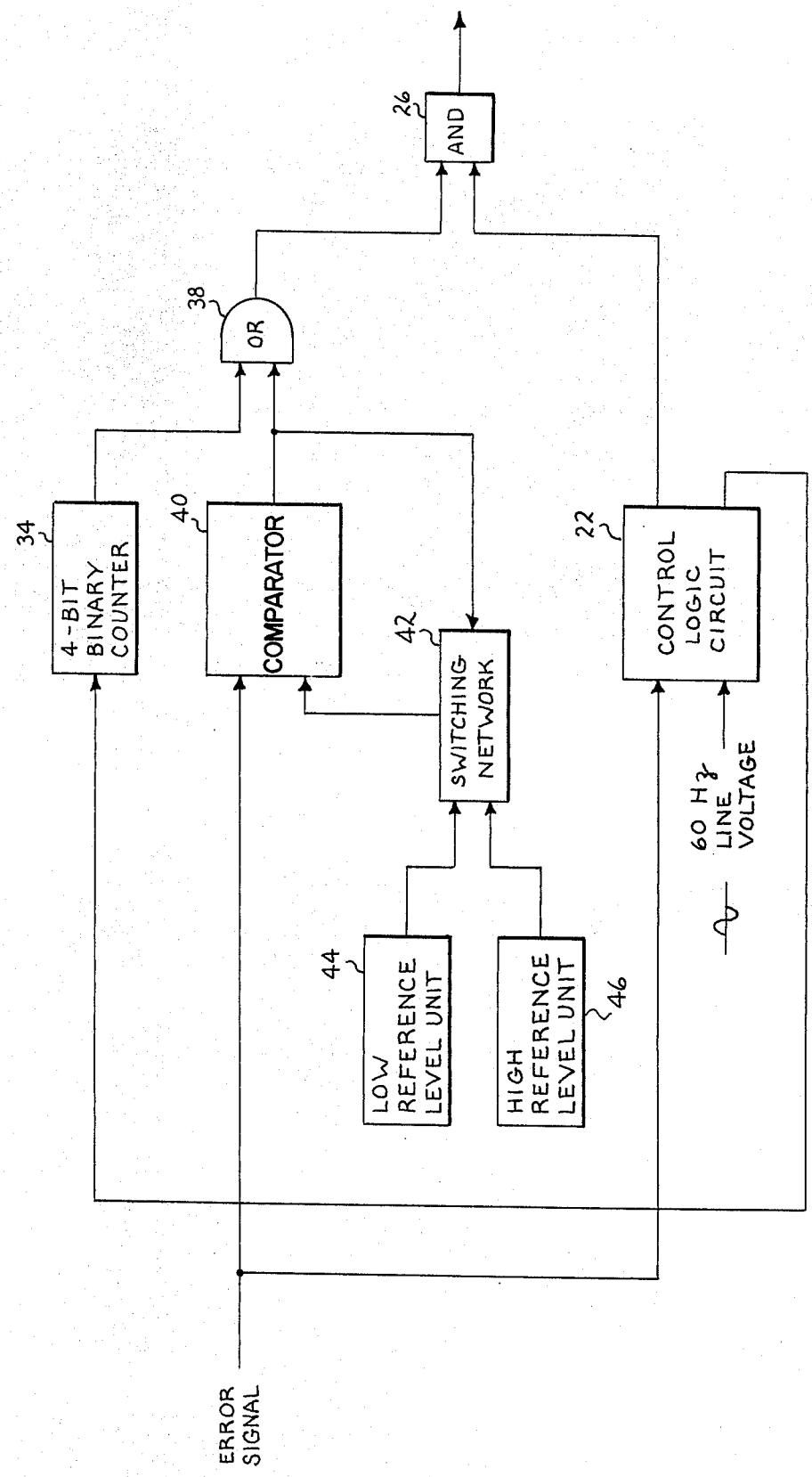
FIG. 2 is a schematic illustration of the adaptive filter circuit of the subject invention.

Referring now to FIG. 2 of the drawings, AND gate 26 as well as the adaptive filter circuit 24 and the control logic circuit 22 are shown in greater detail. The adaptive filter circuit includes a four-bit binary counter 34 which generates a single output pulse for every 16 timing signal pulses received from control logic circuit 22, thereby providing a repetition rate of one 10 cycle pulse for 160 cycles of the line frequency. The output pulses generated by binary counter 34 provide a first input signal to an OR gate 38 which receives a second input signal from a comparator 40, also housed within the adaptive filter circuit. The comparator includes means for comparing the error signal received from summing circuit 20 with first and second reference levels selectively provided by a switching network 42 which senses the output of the comparator to determine which reference level should be used for the comparison. The first and second reference levels are provided to the switching network by low and high reference level units 44 and 46 respectively.

The control signal pulses to AND gate 26 provided by control logic circuit 22 are synthesized by comparing a sawtooth waveshape voltage generated by a ramp generator (not shown) within the control logic circuit, with the error signal from summing circuit 20. The ramp generator is synchronized with the 60Hz line voltage to produce a linearly increasing sawtooth voltage waveform that rises for 10 cycles of the line voltage, falls abruptly to zero, and then repeats itself. The sawtooth voltage waveform generated thereby is continuously compared to the error signal from summing circuit 20 to continuously provide the control signal to AND gate 26. The control signal is actually a train of fixed amplitude pulses, each of which pulse lasts for that fractional part of the 10 cycle period of the 60 Hz line voltage during which the level of the error signal is greater than the instantaneous level of the linearly increasing sawtooth voltage. The width of each enabling pulse, therefore, is directly proportional to the magnitude of the error signal. Thus, an error signal of greater magnitude will cause a control signal pulse of greater width than an error signal of a lesser magnitude.

Figure 3:
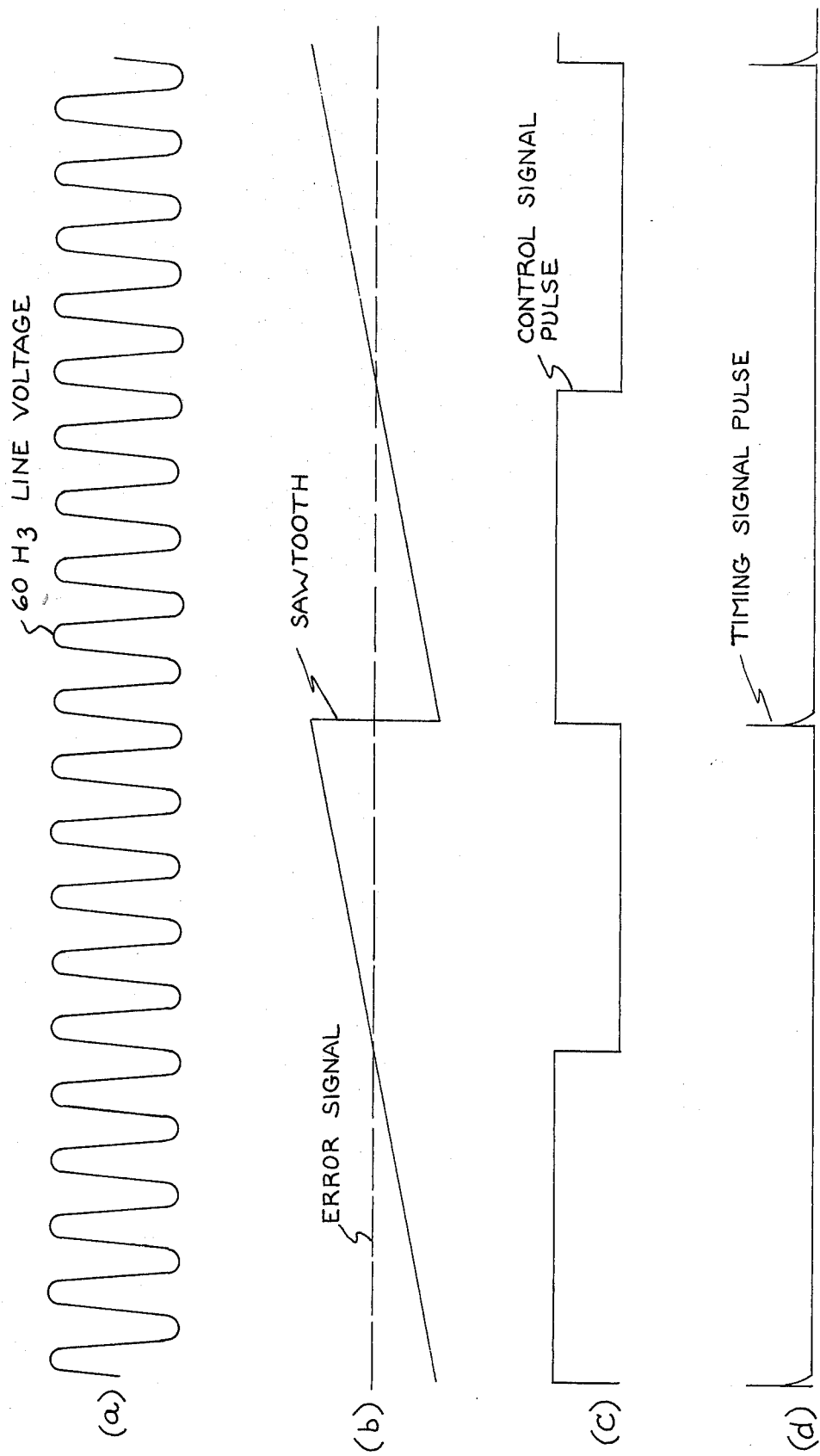
FIG. 3 is a series of waveforms relating to the actuator system and the adaptive filter of the subject invention as disclosed in FIGS. 1 and 2 respectively.

A timing chart indicative of the timing relationship among various waveshapes relating to the above-described circuits is included in FIG. 3 of the drawings. Waveshape (a) discloses a signal representative of the 60 Hz line voltage having application in developing the conrol signal pulse of control logic circuit 22, while waveshape (b) discloses a composite waveshape of both the sawtooth voltage waveform generated by the ramp generator and the error signal provided by summing circuit 20. Waveform (c) is representative of the control signal pulse transmitted to AND gate 26 during those periods of time that the voltage level of the error signal is greater than the instantaneous voltage level of the linearly increasing ramp voltage, while waveform (d) represents the timing signal pulses from control logic circuit 22 used to feed the four-bit binary counter 34 included in the adaptive filter circuit 24. Note that the timing signal pulses of waveform (d) occur at the beginning of each of the control signal pulses of waveform (c).

Operation of the circuit will now be described by first referring to FIG. 1 of the drawings. In most instances, the driven device 14 will be a damper or vane functioning in such a manner so as to control a fluid flow through industrial ducting. As such, the driven device must be responsive to the operational needs for which the damper control is required. Generally, a parameter sensing circuit, such as is shown at 32, is associated with the controlled parameter 34 and the driven device 14, and upon detecting a change in various monitored parameters of the output operation, a signal is generated to effect a change in position of the driven device and thereby cause the monitored output parameters to more closely adhere to the desired result. In most cases, the driven device being controlled may be repositioned so as to open or close, in varying degrees, a passageway through the ducting.

Thus, as the parameter sensing circuit 32, through controlled parameter 34, recognizes the need for the repositioning of driven device 14, it generates a DC voltage level or demand signal which is fed to one input of the summing circuit 36. To the other input of the summing circuit 36 is fed a parameter demand signal derived from the process being controlled. With these two inputs, summing circuit 36 thereby generates a process error or position demand signal, which too, is in the form of a DC voltage level and is applied as a first input to summing circuit 20. An actual position signal from transducer 19, which is also a DC voltage, having a signal level proportional to the actual position of the output shaft 12 is provided as a second input signal to summing circuit 20. In those instances where the driven device is already in the desired position, the DC level of the process error or position demand signal from summing circuit 36 will be equal in magnitude but opposite in polarity to the DC level of the actual position signal from transducer 19. And since the summing circuit 20 responds to the process demand signal and the actual position signal by generating an error signal having a DC voltage level and polarity indicative, respectively, of the magnitude and direction of the motion desired of the driven device 14, in those instances where the driven device is already in the desired position, the error signal generated by the summing network will be zero. Otherwise, an error signal of a representative magnitude and polarity is generated by summing circuit 20 and introduced into both the adaptive filter circuit 24 and the control logic circuit 22. This latter circuit includes means for preserving the polarity of the error signal for later use by firing circuit 28 in determining the proper direction to drive the control motor 10. The control logic circuit further includes means for generating a series of control signal pulses which are initiated at the start of 10 cycle intervals of the line voltage. Each of the control signal pulses, which have a pulse width proportonal to the magnitude of the error signal, are fed to AND gate 26 which, when enabled, as determined by the adaptive filter 24, allows them to pass on to firing circuit 28 to provide the required gating signal for the SCRs controlling motor operation.

Reference is now made to FIGS. 2 and 3 of the drawings which disclose a more detailed view of the subject invention and certain waveforms related to circuit operation, respectively. Thus, to aid in more fully understanding the operation of the subject invention, by way of example it will be presumed that a driven device such as a vane or damper located within industrial ducting demands repositioning. In such a case, summing circuit 20 will cause an error signal to be generated and fed to the control logic circuit 22 and the comparator 40 of the adaptive filter circuit. Referring first to the control logic circuit, in that circuit a timing signal pulse is generated at each 10 cycle interval of the line voltage and then fed to the four-bit binary counter 34 located in the adaptive filter circuit 24. The timing signal is shown at (d) of FIG. 3 of the drawings. At the same time, control logic circuit 22, which also includes a ramp generator (not shown), provides a sawtooth voltage waveform shown in (b) of FIG. 3 which rises linearly for 10 cycles, falls abruptly to zero, and then repeats itself. The error signal being introduced into the control logic circuit 22 from the summing circuit 20 is also shown in (b) of FIG. 3 and is being continuously compared to the sawtooth voltage from the ramp generator. For those periods of time during which the error signal is greater than the instantaneous value of the sawtooth voltage, an enabling pulse will be generated and delivered to AND gate 26. Waveform (c) of FIG. 3 is representative of such a pulse. Thus, an error signal of greater magnitude will cause the control signal pulses to have greater pulse widths since a longer period of time will elapse before the linearly rising sawtooth voltage exceeds the level of the error signal. A longer control signal pulse when applied to the SCRs will, of course, cause the SCRs to conduct for a longer period of time. A longer conduction period of the SCRs will provide the motor 10 with driving power for an extended period of time and thereby cause it to increase its speed. This is desirable since an error of greater degree would generally require a longer period of correction time. In any event, however, the control signal pulses to AND gate 26 will not be passed on to firing circuit 28 until the AND gate is enabled. To this end, reference is now made to the adaptive filter circuit 24 of the subject invention which includes the OR gate 38 providing the second input to enable AND gate 26.

The adaptive filter of the subject invention provides for two distinct modes of filtering operation: a restrictive mode whereby the periodically generated control signal pulses are only limitedly available to exercise control over motor operation; and a nonrestrictive mode whereby all of the periodically generated control signal pulses from control logic circuit 22 are available to exercise complete control over motor operation.

Referring first to the restrictive mode of filtering, it is noted that such filtering operation is highly desirable during those periods of time when the driven device is positioned within some small range from a desired position such that the noise generated within the process loop would be as great if not greater than the small error signal generated to indicate the position error. An example of such an instance would be during some relative static condition when the output parameters are somewhat constant and very little, if any, repositioning of the driven device is desired. And although no appreciable steady state error signal is developed by transducer 19 and parameter sensing circuit 32, noise will be generated by the high gain loops, which noise would normally cause the motor to be constantly repositioning the driven device a slight amount in either direction. With the filter system of the subject invention operating in the restrictive mode, motor 10 receives powering pulses from the SCRs only 1/16 of the operating time. Thus, all signals, including any noise signals generated within the closed loop, are also inhibited from influencing motor operation 15/16 of the time when operating in the restrictive mode. But as long as the driven device remains within some predetermined range from a desired position, unnecessary repositioning of the motor will be avoided.

Referring now to the nonrestrictive mode of filtering, it is seen that in those instances where the driven device is required to be repositioned to some new position outside of the small predetermined range of some previous position, the filter system includes means for providing the motor controlling the driven device with all available powering signals such that the motor is completely responsive to the needs of the driven device.

In actual operation, filtering mode selection is determined by the comparator 40 which includes means for sensing and comparing the level of the error signal with either the low or high reference levels as provided by switching network 42. In most instances the system will be operating in the restrictive filtering mode whereby only a minimal amount of repositioning of the driven device is required. During this time the error signal from summing circuit 20 to comparator 40 is compared to the high level reference level provided by high reference level unit 46 through switching network 42. In this restrictive mode of operation the comparator 40 will not provide an input to OR gate 38 which would, therefore, receive only one pulse from binary counter 34 for every 16 input pulses provided thereto by control logic circuit 22. For this reason, the control signal pulses generated in control logic circuit 22 are only allowed to pass on to firing circuit 28 through AND gate 26 only 1/16 of the operating time; or expressing this another way, only during those periods that OR gate 38 is provided with an input pulse from binary counter 34 to provide an enabling pulse to AND gate 26.

In those instances where a greater control over the driven device is required, such as when the driven device is required to be repositioned relatively far from some prior position, an error signal of relatively large magnitude will be generated. When this relatively larger error signal exceeds the high reference level generated by high voltage reference level unit 46, comparator 40 is caused to pass a continuous enable signal to OR gate 38 which, therefore, remains enabled for 100 percent of the operating time. During this period of nonrestrictive filtering AND gate 26 will pass all control signal pulses generated in control logic circuit 22 and allow them to be transmitted on to firing circuit 28 to control SCR firing, and hence, motor speed.

Thus, while in the nonrestrictive mode of filtering, as the driven device 14 is caused to assume the new demanded position, an error signal of diminishing magnitude is provided to the comparator 40 for comparison. The error signal, however, is compared not to the high reference voltage level as it was to determine when to switch from a first mode of filtering to a second mode of filtering; instead, it is compared to the low reference level from low voltage reference level unit 44 as switched in by switching network 42 immediately after the error signal was sensed as being greater than the high reference voltage level. Because of the magnitude difference in the high and low voltage reference levels, therefore, the adaptive filter 24 continues to operate in the nonrestrictive filtering mode of operation until the driven device is actually positioned within a closer tolerance than required to cause switching from the restrictive to the nonrestrictive mode of filtering. When the error signal finally diminishes to less than the low reference voltage level, the system switches back to the restrictive mode of filtering and the error signal is once again compared to the high voltage reference level.

Thus, by the above-described apparatus, an adaptive filter arrangement is provided which allows for minimal control over a driven device during those times when such control is not critical for the purpose of reducing the effects of spurious noise attached to an error control signal. The invention further provides means for reducing the filtering action to allow much more positive control over the driven device whenever the error signal rises above some predetermined value, and moreover, allows for a lower, less tolerant reference to be compared to the error signal at that time so as to drive the driven device to a position even more closely in conformity with the demanded position than that required to initially cause filter mode switching.

While there is shown and described a specific embodiment of this invention, it will be understood that this invention is not limited to the particular construction shown and described, and it is intended by the appended claims to cover all modifications within the spirit and scope of this invention.

What is claimed is:

1. In a process control system which includes means for generating control signal pulses in response to an error signal, a filter circuit for minimizing the effects of noise associated with said error signal, and filter circuit comprising:
   a. means to generate a train of control signal pulses;
   b. first means responsive to said error signal for selectively inhibiting a preselected number of control signal pulses whenever said error signal is less than a first predetermined value; and
   c. second means responsive to said error signal for allowing said control signal pulses to pass whenever said error signal is greater than said first predetermined value.

2. The filter circuit as recited in claim 1 wherein said first means includes a counter circuit for counting to said preselected number of control signal pulses.

3. In a process control system which includes means for generating control signal pulses in response to an error signal, a filter circuit for minimizing the effects of noise associated with said error signal, said filter circuit comprising:
   a. means to generate a train of control signal pulses;
   b. first means responsive to said error signal for selectively inhibiting a preselected number of control signal pulses whenever said error signal is less than a first predetermined value;
   c. second means responsive to said error signal for allowing said control signal pulses to pass whenever said error signal is greater than said first predetermined value; and d. third means responsive to said error signal for allowing said control signal pulses to pass whenever said error signal is greater than a second predetermined value after having first become greater than said first predetermined value, said second predetermined value being less than said first predetermined value.

4. The filter circuit as recited in claim 3 wherein said third means includes means to generate a first reference signal proportional to said first predetermined value, and means to generate a second reference signal proportional to said second predetermined value, said third means including logic means for switching from said first reference signal to said second reference signal whenever said error signal is greater than said first predetermined value.

5. A process control system for controlling a process having a controllable parameter, said system including a positionable driven device and a position drive motor for positioning said driven device, said system comprising:
   a. means responsive to said controllable parameter to generate a first signal;
   b. means associated with said process to provide a second signal;
   c. means responsive to said first and second signals to generate a first difference signal;
   d. means responsive to said positionable driven device to generate a third signal indicative of the position of said driven device;
   e. means responsive to said first difference signal and said third signal to generate an error signal;
   f. means for generating control signal pulses in response to said error signal; and
   g. a filter circuit for minimizing the effects of noise associated with said error signal, including
      1. means to generate a train of control signal pulses,
      2. first means responsive to said error signal for selectively inhibiting a preselected number of control signal pulses whenever said error signal is less than a predetermined value, and
      3. second means responsive to said error signal for allowing said control signal pulses to pass whenever said error is greater than said first predetermined value.

6. The process control system as recited in claim 5 wherein said first means includes a counter circuit for counting to said preselected number.

7. The process control system as recited in claim 5 wherein said filter circuit includes a third means responsive to said error signal for allowing said control signal pulses to pass whenever said error signal is greater than a second predetermined value after having first become greater than said first predetermined value, said second predetermined value being less than said first predetermined value.

8. The filter circuit as recited in claim 7 wherein said third means includes means to generate a first reference signal proportional to said first predetermined value, and means to generate a second signal proportional to said second predetermined value, said third means including logic means for switching from said first reference signal to said second reference signal whenever said error signal is greater than said first predetermined value.

* * * * *

UNITED STATES PATENT AND TRADEMARK OFFICE
CERTIFICATE OF CORRECTION

PATENT NO. : 3,961,234
DATED : June 1, 1976
INVENTOR(S) : George Sutton Chambers and Carter Sinclair It is certified that error appears in the above-identified patent and that said Letters Patent are hereby corrected as shown below:

Column 4, line 8, cancel "conrol" and substitute --control--.
Column 5, line 59, after "invention which" insert --circuit--.
Column 8, line 47, after "less than a" insert --first--.

Signed and Sealed this

Fifteenth Day of March 1977

[SEAL]

Attest:

RUTH C. MASON
Attesting Officer

C. MARSHALL DANN
Commissioner of Patents and Trademarks